US009952545B2

(12) United States Patent
Nito

(10) Patent No.: US 9,952,545 B2
(45) Date of Patent: Apr. 24, 2018

(54) MOTOR CONTROL APPARATUS AND IMAGE FORMING APPARATUS

(71) Applicant: CANON KABUSHIKI KAISHA, Tokyo (JP)

(72) Inventor: Yuta Nito, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/152,716

(22) Filed: May 12, 2016

(65) Prior Publication Data

US 2016/0342125 A1 Nov. 24, 2016

(30) Foreign Application Priority Data

May 20, 2015 (JP) ................... 2015-103173

(51) Int. Cl.
*G03G 15/00* (2006.01)
*H02P 8/14* (2006.01)

(52) U.S. Cl.
CPC ........... *G03G 15/6529* (2013.01); *H02P 8/14* (2013.01)

(58) Field of Classification Search
CPC .... G03G 15/043; G03G 15/6529; H01S 5/06; H02P 8/14; H02P 21/22
See application file for complete search history.

(56) References Cited

U.S. PATENT DOCUMENTS

| 6,850,027 | B2 | 2/2005 | Kuwano et al. |
| 8,970,146 | B2 | 3/2015 | Pollock et al. |
| 2001/0043048 | A1* | 11/2001 | Tajima ................ H02P 21/18 318/727 |
| 2003/0178965 | A1 | 9/2003 | Kuwano et al. |
| 2009/0218973 | A1* | 9/2009 | Pollock ................ H02P 25/098 318/400.32 |
| 2011/0285332 | A1 | 11/2011 | Pollock et al. |
| 2012/0200244 | A1* | 8/2012 | Otokawa ............... H02P 27/085 318/400.13 |
| 2013/0014624 | A1* | 1/2013 | Eoka .................... B65H 35/04 83/156 |
| 2013/0193883 | A1* | 8/2013 | Shitabou .............. H02P 6/00 318/400.3 |

(Continued)

FOREIGN PATENT DOCUMENTS

| JP | 3661864 B2 | 6/2005 |
| JP | 5537565 B2 | 7/2014 |

*Primary Examiner* — David Banh
(74) *Attorney, Agent, or Firm* — Fitzpatrick, Cella, Harper & Scinto

(57) ABSTRACT

A motor control apparatus that performs a drive control of a motor includes a current detector configured to detect a driving current flowing in a winding of the motor, a calculator configured to calculate an estimated value indicating a rotational position of a rotor of the motor by an estimation computation based on a value of the driving current detected by the current detector, and a corrector configured to correct the estimated value of the rotational position based on a rotation amount of the rotor in a predetermined period from a start of the estimation computation by the calculator until completion of the estimation computation. In addition, a controller controls the driving current flowing in the winding of the motor so that a deviation between the estimated value corrected by the corrector and an instructed value indicating a target position of the rotor is reduced.

21 Claims, 9 Drawing Sheets

(56) References Cited

U.S. PATENT DOCUMENTS

| | | | |
|---|---|---|---|
| 2015/0084265 A1* | 3/2015 | Kawashima | B65H 7/20 |
| | | | 271/3.19 |
| 2015/0333682 A1* | 11/2015 | Amemiya | H02P 21/05 |
| | | | 318/400.02 |
| 2016/0126871 A1* | 5/2016 | Uematsu | H02P 27/08 |
| | | | 318/400.02 |
| 2016/0315565 A1* | 10/2016 | Vuletic | H02P 6/002 |
| 2017/0047872 A1* | 2/2017 | Spenninger | H02P 6/10 |

* cited by examiner

DIRECTION OF ROTATION : CW

DIRECTION OF ROTATION : CCW

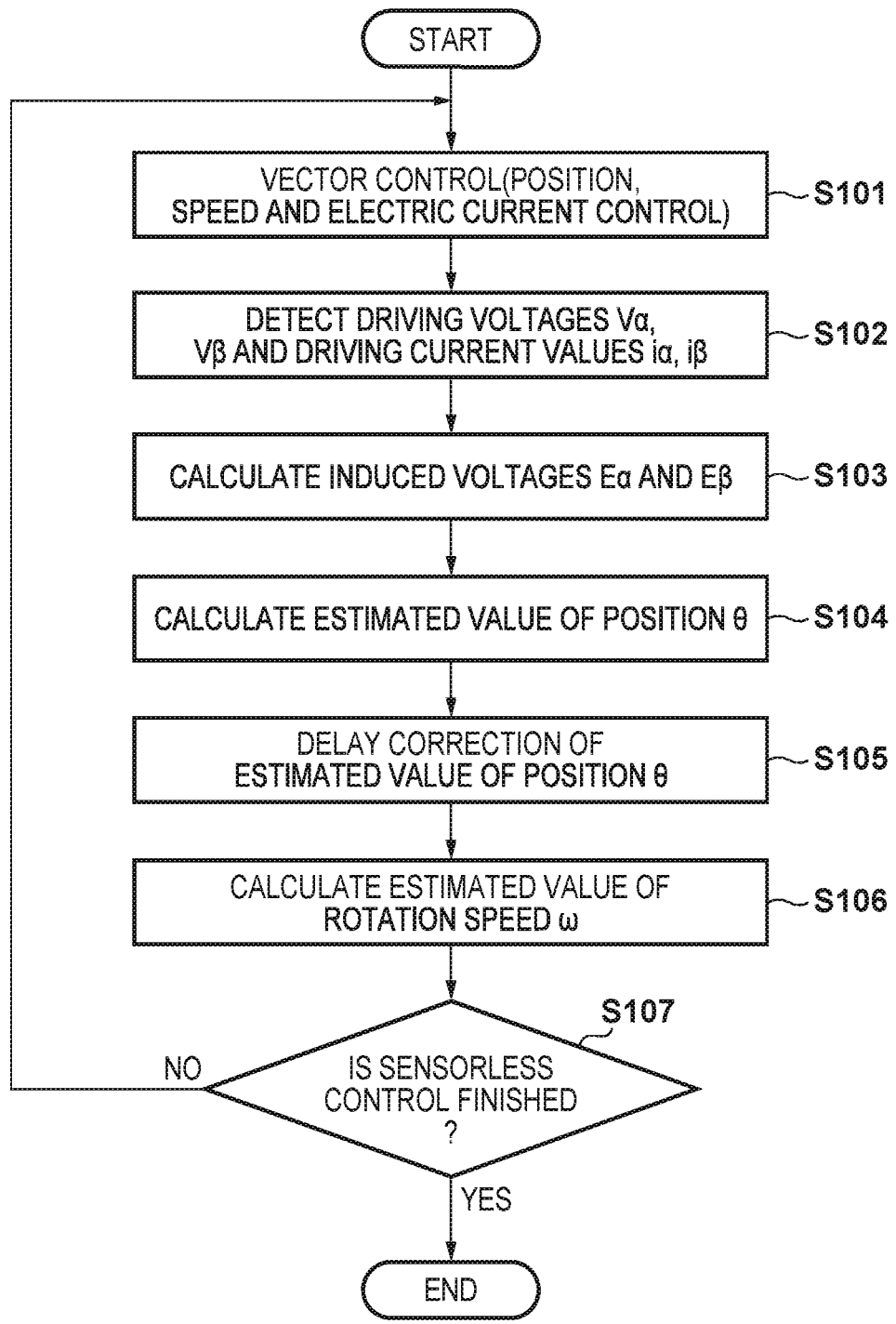

MOTOR CONTROL APPARATUS AND IMAGE FORMING APPARATUS

BACKGROUND OF THE INVENTION

1. Field of the Invention

The present invention relates to a drive control for a motor, and particularly relates to a drive control for a motor such as a stepping motor that can be used as a driving source for controlling conveyance of a recording material in an image forming apparatus such as a copying machine or a printer.

2. Description of the Related Art

In electrophotographic image forming apparatuses such as copying machines, printers, and the like, stepping motors are widely used as a driving source of a conveyance system for conveying a recording material such as a sheet on which an image is formed, and the like. A stepping motor has advantages that even if a mechanism for detecting a position and rotation speed of the motor is not provided, it is possible to perform speed control easily by controlling a pulse period applied to the motor, and also it is possible to perform position control easily by controlling the number of pulses applied to the motor. (This method of control is referred to generally as synchronization control.) However, when performing synchronization control of a stepping motor, if a load torque necessary in the apparatus exceeds a torque range that can be output, a step-out state which is a state in which synchronization with an input pulse is not performed and it is uncontrollable is entered. If the motor enters a step-out state, conveyance of recording materials becomes impossible. This results in the occurrence of a paper jam, and it becomes necessary for the user to remove the paper stuck in the image forming apparatus. To avoid this, a motor output torque capable of supporting a change of the load torque that becomes necessary in the apparatus is required. For this, it is necessary to supply a driving current to the motor in order for a motor output torque having a predetermined margin with respect to the load torque necessary in the apparatus to be obtained. There was a problem in that as a result of this, more power was consumed than necessary, and vibrations and noise would occur in the apparatus due to surplus torque.

As a technique for dealing with such problems, a method called vector control (also FOC: Field Oriented Control) has been proposed as recited in U.S. Pat. No. 6,850,027 and U.S. Publication No. 2011/0285332. Vector control is a method of controlling amplitude and phase of a driving current so that a maximum torque is generated for a motor using a rotating coordinate system defining a rotor magnetic flux direction as a d axis, and a direction orthogonal thereto as a q axis. In the rotating coordinate system, a q axis component (a q axis current) of the driving current is a torque current component that generates torque, and a d axis component (a d axis current) of the driving current is an excitation current component that influences the rotor magnetic flux intensity. In particular, torque control is possible using only the q axis current without requiring a d axis current in a motor that uses a permanent magnet for a rotor as with a stepping motor. As a result, because the driving current of the motor in the stationary coordinate system becomes an ideal sinusoidal wave, not only is it possible to realize a drive control for which power efficiency is good, vibration and noise of the apparatus caused by surplus torque as described above are suppressed.

In the foregoing vector control, it is necessary to detect the position and the rotation speed of the rotor, and it is typical to perform the detection using a rotary encoder. However, there are problems of a cost increase and layout space allocation in the case where vector control is realized using a rotary encoder which is unnecessary in a conventional stepping motor control. For this reason, it is desired to be able to realize vector control without using a rotary encoder. In U.S. Publication No. 2011/0285332, a method of estimating position and rotation speed of a rotor without using a rotary encoder has been proposed. Specifically, by detecting a motor driving current, and calculating an arctangent of an induced voltage ratio in an A-phase and a B-phase estimated based on a voltage equation, the position of the rotor is estimated. A rotation speed of the rotor is estimated by a temporal differentiation of the estimation result for the rotor position.

If the position of the rotor is estimated at a certain control period using the method proposed in U.S. Publication No. 2011/0285332, an error occurs in the estimated position of the rotor due to a delay accompanying the estimation computation for estimating the position. In particular, the estimated position error becomes larger in a region where the number of rotations of the rotor is higher. In U.S. Publication No. 2011/0285332, the influence of this kind of estimated position error on the vector control is not made clear. However, according to the simulations and tests by the inventors, the estimated position error of the rotor was found to actually not only worsen the motor control efficiency significantly in the vector control, but also to bring the motor to an uncontrollable state.

SUMMARY OF THE INVENTION

The present invention has been conceived in view of the above described problems. The present invention provides a technique for reducing an estimation error that occurs by a delay accompanying estimation computation of a rotational position of a motor in a motor control apparatus for performing drive control of the motor by vector control.

According to one aspect of the present invention, there is provided a motor control apparatus that performs a drive control of a motor, the apparatus comprising: a vector control unit configured to perform a vector control that determines a driving current supplied to the motor based on a current value on a rotating coordinate system with a rotational position of a rotor of the motor as a reference, and to output a driving voltage corresponding to the determined driving current; a driving unit configured to drive the motor by supplying to the motor a driving current in accordance with the driving voltage output by the vector control unit; a current detection unit configured to detect a driving current flowing in a winding of each phase of the motor; a calculation unit configured to calculate the rotational position to be used for the vector control by an estimation computation based on a value of the driving current detected by the current detection unit; and a correction unit configured to correct an estimated value of the rotational position in accordance with a rotation speed of the motor so that an error that occurs in the estimated value with respect to an actual rotational position of the rotor due to a delay accompanying the estimation computation is reduced.

According to another aspect of the present invention, there is provided an image forming apparatus comprising an image formation unit configured to form an image on a recording material; a motor configured to drive a roller for conveying a recording material on which an image is formed by the image forming unit; and a motor control apparatus that performs a drive control of a motor, wherein the motor control apparatus comprises: a vector control unit configured to perform a vector control that controls a driving current supplied to the motor based on a current value on a rotating coordinate system with a rotational position of a rotor of the motor as a reference, and to output a driving voltage corresponding to the driving current; a driving unit configured to drive the motor by supplying to the motor a driving current in accordance with the driving voltage output by the vector control unit; a current detection unit configured to detect a driving current flowing in a winding of each phase of the motor; a calculation unit configured to estimate the rotational position to be used for the vector control by an estimation computation based on a value of the driving current detected by the current detection unit; and a correction unit configured to correct an estimated value of the rotational position in accordance with a rotation speed of the motor so that an error that occurs in the estimated value with respect to an actual rotational position of the rotor due to a delay accompanying the estimation computation is reduced, and wherein a rotation direction of the motor changes in accordance with a direction of conveyance of the recording material by the roller, and the correction unit adds a correction amount in accordance with the rotation speed to the estimated value if the rotation direction of the motor is a first rotation direction, and subtracts the correction amount from the estimated value if the rotation direction of the motor is a second rotation direction opposite the first rotation direction.

By virtue of the present invention, it is possible to reduce an estimation error that occurs by a delay accompanying estimation computation of a rotational position of a motor in a motor control apparatus for performing drive control of the motor by vector control. Accordingly, it is possible to prevent the motor from reaching an uncontrollable state while improving efficiency of power consumption of the motor by vector control.

Further features of the present invention will become apparent from the following description of exemplary embodiments (with reference to the attached drawings).

BRIEF DESCRIPTION OF THE DRAWINGS

FIG. 9 is a flowchart for illustrating a control flow by the motor controller.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Image Forming Apparatus>

Figure 1:
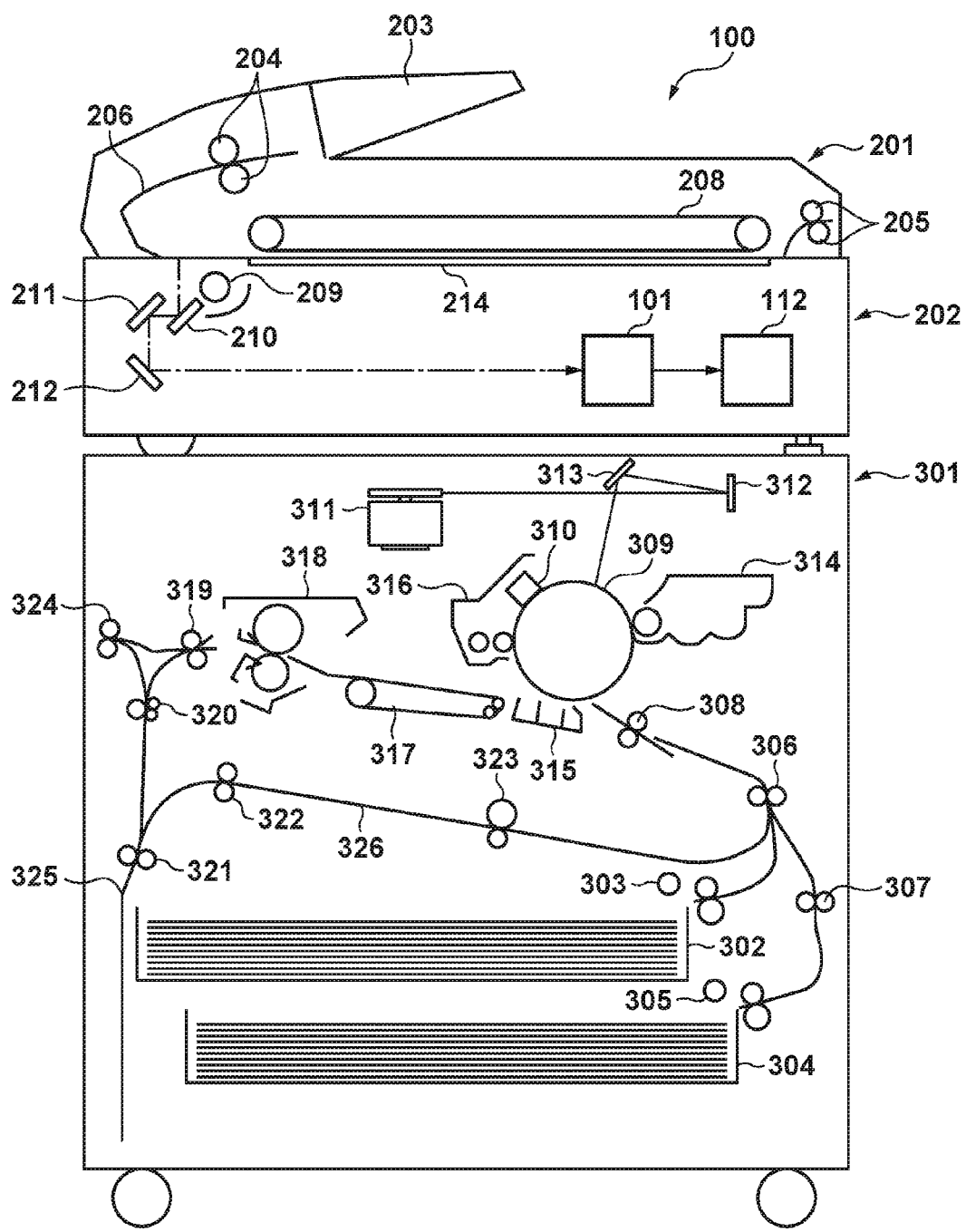
FIG. 1 illustrates an example configuration of an entirety of an image forming apparatus.

Firstly, an example configuration of an image forming apparatus in which a motor control apparatus according to embodiments of the present invention is implemented is explained with reference to FIG. 1. An image forming apparatus 100 illustrated in FIG. 1 includes an automatic document feeder 201, a reading apparatus 202, and an image forming apparatus main body 301.

An original placed on an original placing unit 203 of the automatic document feeder 201 is fed one sheet at a time by a sheet feed roller 204, and is conveyed to a platen glass 214 of the reading apparatus 202 via a conveying guide 206. Additionally, the original is discharged to outside of the apparatus by a discharge roller 205 after a fixed speed conveyance by a conveyance belt 208. In this period, a reflected light from an original document image illuminated by an illumination system 209 at a reading position of the reading apparatus 202 is guided to the image reading unit 101 by an optical system including reflection mirrors 210, 211, 212, and converted into an image signal by the image reading unit 101. The image reading unit 101 includes a lens, a CCD which is a photoelectric conversion element, a driving circuit of the CCD, and the like. An image signal outputted from the image reading unit 101 is outputted to the image forming apparatus main body 301 after various correction processing is performed by an image processing module 112 configured by a hardware device such as an ASIC.

There are a flow reading mode and a fixed mode as original reading modes in the reading apparatus 202. The flow reading mode is a mode for reading an image of an original while conveying the original at a fixed speed in a state in which the illumination system 209 and the optical system are stopped. The fixed mode is a mode in which when an original is placed on the platen glass 214 of the reading apparatus 202, an image of the original placed on the platen glass 214 is read while the illumination system 209 and the optical system are moved at a fixed speed. Usually, an original which is of a sheet form is read using the flow reading mode, and a bound original is read using the fixed mode.

The image forming apparatus 100 has a copy function for forming an image on a recording sheet (a recording material) in units of pages in the image forming apparatus main body 301 based on the image signal outputted from the reading apparatus 202. Note, the image forming apparatus 100 has a printing function for forming an image on a recording sheet based on data received from an external apparatus through a network.

An image signal outputted from the reading apparatus 202 is inputted to an optical scanning apparatus 311. The optical scanning apparatus 311 includes a semiconductor laser and a polygon mirror, and outputs a laser beam (optical signal) modulated using an inputted image signal from the semiconductor laser. A photosensitive drum 309 is exposed by a laser beam outputted from the semiconductor laser being illuminated onto a surface of the photosensitive drum 309 via the polygon mirror, and mirrors 312 and 313. An electrostatic latent image is formed on the photosensitive drum 309 by exposing, using the laser beam, the photosensitive drum 309 whose surface is charged uniformly by a charger 310. A toner image is formed on the photosensitive drum 309 by developing the electrostatic latent image formed on the photosensitive drum 309 using a toner supplied from a developing unit 314. When a toner image on the photosensitive drum 309 is moved to a position (a transfer position) opposing to a transfer separator 315 along with a rotation of the photosensitive drum 309, the tone image is transferred onto the recording sheet by the transfer separator 315.

The recording sheet is contained in paper cassettes 302 and 304, and different kinds of recording sheets can be contained. For example, a standard recording sheet is contained in the paper cassette 302, and a tab sheet is contained in the paper cassette 304. A recording sheet contained in the paper cassette 302 is fed to the conveyance path by a sheet feed roller 303, is conveyed to a position of a registration roller 308 by the conveyance roller 306, and is stopped there temporarily. Meanwhile, a recording sheet contained in the paper cassette 304 is fed to the conveyance path by a sheet feed roller 305, is conveyed to a position of a registration roller 308 by the conveyance rollers 307 and 306, and is stopped there temporarily.

The recording sheet conveyed to the position of the registration roller 308 is conveyed to the transfer position by the registration roller 308 in accordance with a timing at which a toner image on the photosensitive drum 309 reaches the transfer position. The recording sheet on which the toner image is transferred from the photosensitive drum 309 at the transfer position is conveyed to a fixing unit 318 by a conveyance belt 317. The fixing unit 318 fixes the toner image on the recording sheet to the recording sheet using heat and pressure.

In a case where an image formation is performed in a single-sided print mode, the recording sheet which passes through the fixing unit 318 is discharged to the outside of the apparatus by discharge rollers 319 and 324. In a case where the image formation is performed in a double-sided print mode, the recording sheet where an image is formed on the front surface (a first surface) is conveyed to a reversing path 325 by the discharge roller 319, a conveyance roller 320 and a reversing roller 321 after passing through the fixing unit 318. Furthermore, by reversing a rotation of the reversing roller 321, the recording sheet starts to be conveyed in the opposite direction immediately after a trailing edge of the recording sheet passes through a confluence point of the reversing path 325 and a double-sided path 326, and is conveyed to the double-sided path 326. After that, the recording sheet is conveyed over the double-sided path 326 by the conveyance rollers 322 and 323, again conveyed to the position of the registration roller 308 by the conveyance roller 306, and is stopped there temporarily. Furthermore, similarly to the image formation on the front surface (the first surface) of the recording sheet, the toner image transferring process for the back surface (a second surface) of the recording sheet is performed at the transfer position, and additionally after the fixing process is performed by the fixing unit 318, the recording sheet is discharged to the outside of the apparatus. In this way, when an image is formed on both sides of the recording sheet, the reversing roller 321 functions as a reversing roller for reversing a direction of conveyance of the recording sheet on the conveyance path.

Also, in a case where the recording sheet is discharged to the outside of the apparatus having reversed the front and back of the recording sheet whose front surface the image is formed on (reversing so that the first surface faces down), the recording sheet passes through the fixing unit 318 is conveyed in the direction towards to the conveyance roller 320 temporarily, not the direction towards to the discharge roller 324. Then, by reversing the rotation of the conveyance roller 320 immediately before the trailing edge of the recording sheet passes through the position of the conveyance roller 320, the recording sheet starts to be conveyed to the opposite direction and is conveyed in the direction towards the discharge roller 324. As a result, the recording sheet is discharged to the outside of the apparatus by the discharge roller 324 in a state in which the front and back are reversed. In this way, when the conveyance roller 320 reverses the front and back and discharges the recording sheet on which the image formation is performed, it functions as a reversing roller for reversing a direction of conveyance of the recording sheet on the conveyance path.

In this way, the image forming apparatus main body 301 includes the conveyance rollers 306, 307, the discharge roller 319, the reversing roller 321, the conveyance roller 322 and 323, and the discharge roller 324 as a roller for conveyance of the recording sheet where the image is formed. The drive control of a motor for driving each of these rollers is performed by a motor controller 157 (FIG. 2) according to an instruction from a system controller 151 (FIG. 2) as will be explained later.

(Control Configuration of Image Forming Apparatus)

Figure 2:
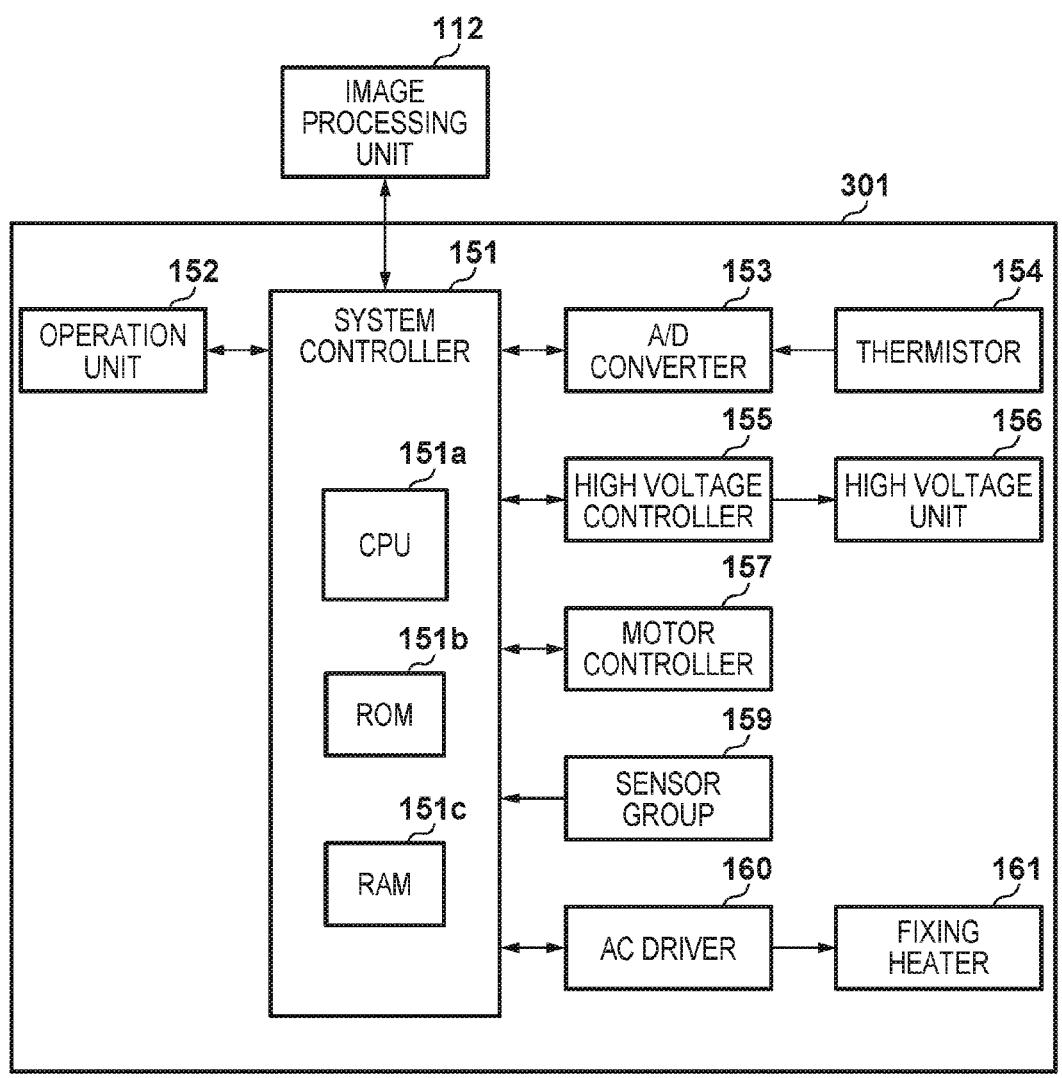
FIG. 2 is a block diagram for illustrating a control configuration example of the image forming apparatus.

FIG. 2 is a block diagram for illustrating a control configuration example of the image forming apparatus 100. The system controller 151 illustrated in FIG. 2 includes a CPU 151$a$, a ROM 151$b$, and a RAM 151$c$, and controls the entirety of the image forming apparatus 100. The system controller 151 is connected to an image processing unit 112, an operation unit 152, an analog/digital (A/D) converter 153, a high voltage controller 155, a motor controller 157, a sensor group 159, and an AC driver 160. The system controller 151 is capable of performing a data exchange with each connected unit.

The CPU 151$a$ executes various sequences relating to a predetermined image forming sequence by reading and executing various programs stored in the ROM 151$b$. The RAM 151$c$ is a volatile storage device and is used as a work area for the CPU 151$a$ to execute various programs, or as a temporary storage area for storing various data temporarily. Data such as, for example, a setting value for the high voltage controller 155, a command value for the motor controller 157, information received from the operation unit 152, or the like, is stored in the RAM 151$c$.

The system controller 151 controls the operation unit 152 so that an operation screen for a user to perform various settings is displayed on a display unit arranged in the operation unit 152, and setting by the user via the operation unit 152 are received. The system controller 151 receives from the operation unit 152 information indicating content (such as a copying scaling factor setting value or a density setting value) of settings by the user via the operation unit 152. Also, the system controller 151 transmits data to the operation unit 152 to notify a state of the image forming apparatus to the user. The operation unit 152 displays on a display unit information indicating a state of the image forming apparatus (for example, the number of image forming materials, information indicating whether or not image forming is being performed now, and information indicating a jam occurrence and the occurrence location) based on data received from the system controller 151.

The system controller 151 (the CPU 151$a$) transmits to the image processing unit 112 the setting value data of each device in the image forming apparatus 100 which is required for the image processing in the image processing unit 112. Also, the system controller 151 receives a signal from each device (a signal from a sensor group 159) and controls the high voltage controller 155 based on the received signal. The high voltage controller 155 supplies a voltage required for each operation to the charger 310, the developing unit 314, and the transfer separator 315 that compose a high voltage unit 156, based on a setting value outputted from the system controller 151.

The A/D converter 153 receives a detection signal from a thermistor 154 for detecting a temperature of a fixing heater 161, converts this detection signal into the digital signal, and transmits it to the system controller 151. The system controller 151 controls a temperature of a fixing heater 161 to a desired temperature for fixing processing by controlling the AC driver 160 based on the digital signal received from the A/D converter 153. Note that the fixing heater 161 is a heater included in the fixing unit 318 and used for fixing processing.

In this way, the system controller 151 controls the operation sequence of the image forming apparatus 100. Also, the system controller 151 controls a driving sequence of each motor through the motor controller 157. The motor controller 157 controls the motor corresponding to the driving source for driving a roller for conveyance of a recording sheet (a stepping motor 509 illustrated in FIG. 3 and FIG. 8) in accordance with an instruction from the system controller 151. Note that the image forming apparatus 100 includes, for each motor corresponding to a roller for conveyance of the recording sheet, a motor controller 157 controlling the motor. According to this embodiment, the motor controller 157 is an example of the motor control apparatus that performs the drive control of the motor.

The system controller 151 (the CPU 151a) corresponding to an external controller of the motor controller 157 generates a command value (θ_ref) of a position (a rotational position) of a motor (the stepping motor 509) to be controlled and outputs the generated command value to the motor controller 157. For example, the position command value θ_ref is a pulse-form rectangular wave signal and 1 pulse defines a minimum amount of change of the rotational angle of the stepping motor. Note that the command value of the rotation speed of the motor (a speed command value ω_ref) is obtained as a frequency corresponding to θ_ref. When a driving sequence of the motor is started, the CPU 151a outputs the generated position command value θ_ref to the motor controller 157 at a predetermined time period (control period). The motor controller 157 executes a position control and speed control of the motor (the stepping motor 509) in accordance with the position command value provided from the CPU 151a.

<Vector Control>

Figure 3:
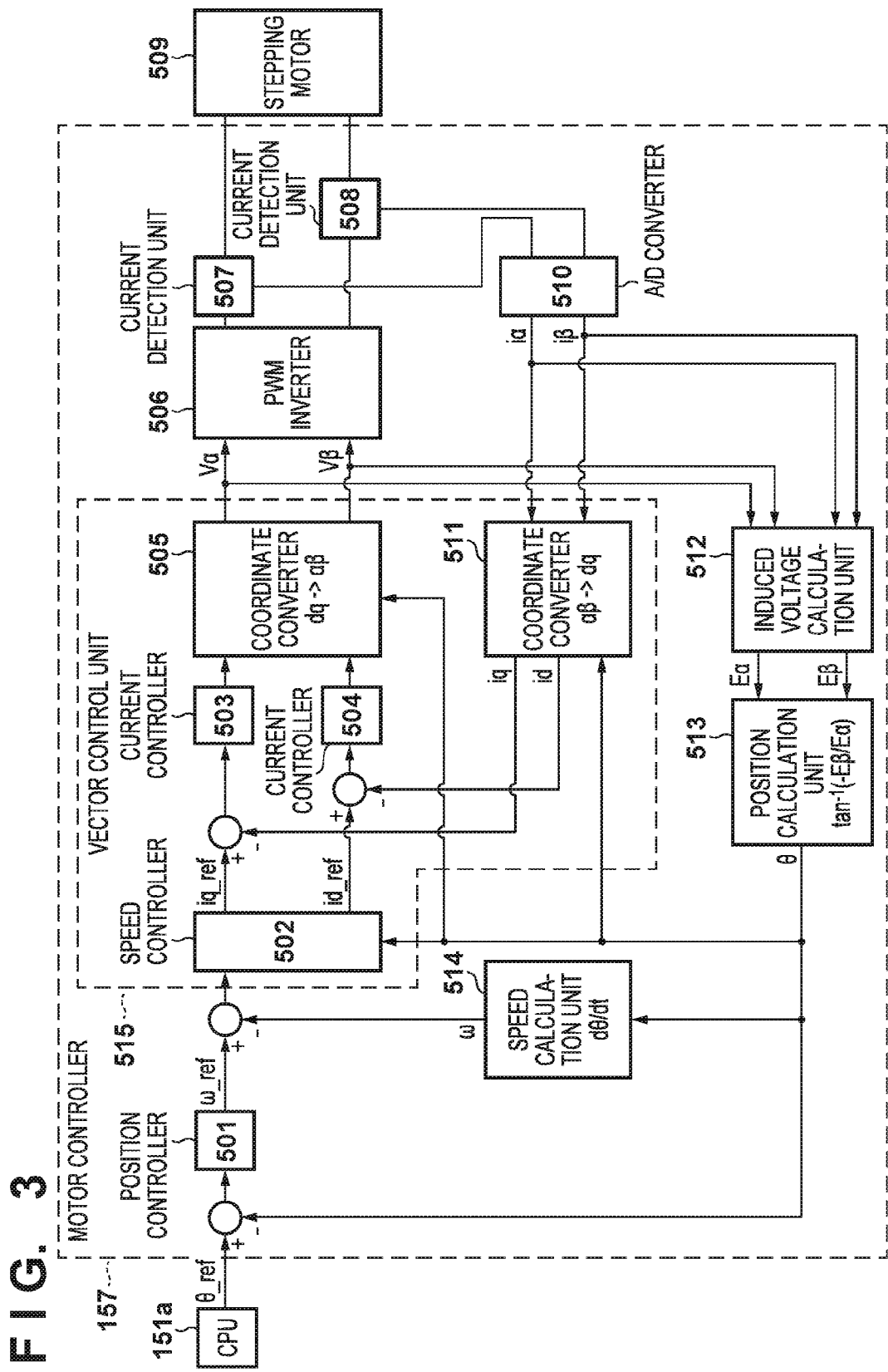
FIG. 3 is a block diagram for illustrating an example configuration (a comparative example) of a motor controller.

Next, an overview of a vector control of the stepping motor 509, executed by the motor controller 157, is explained with reference to FIGS. 3 and 4. FIG. 3 is a block diagram for illustrating an example configuration of the motor controller 157 corresponding to a comparative example for the present embodiment. A basic configuration of the motor controller 157 illustrated in FIG. 3 is a configuration corresponding to an inverter control using a coordinate transformation from a stationary coordinate system to a rotating coordinate system utilized in the motor such as a brushless DC motor or an AC servo motor.

In the motor controller 157, the stepping motor 509 is driven by a PWM inverter 506 supplying driving currents to the stepping motor 509 in accordance with the driving voltages of the stepping motor 509 Vα and Vβ outputted from a vector control unit 515. Note that, as illustrated in FIG. 3, the vector control unit 515 includes a speed controller 502, current controllers 503 and 504, and the coordinate converters 505 and 511.

Figure 4:
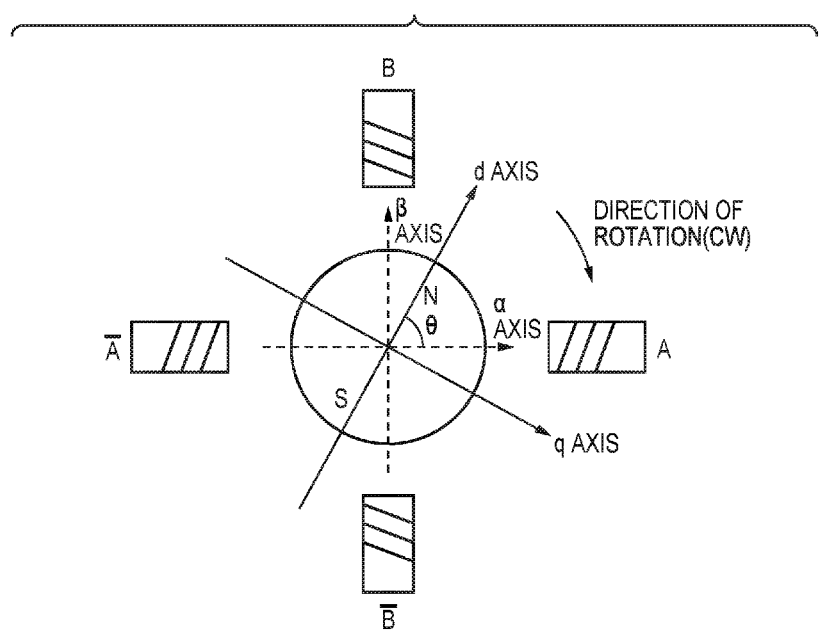
FIG. 4 illustrates a relationship between the motor and dq axes of a rotating coordinate system.

Here, FIG. 4 illustrates a relationship between a dual-phase motor including A-phase and B-phase, and the d axis and the q axis of the rotating coordinate system. In this figure, the axes corresponding to windings of A-phase and B-phase in the stationary coordinate system are defined to be α axis and β axis. Also, an angle formed by α axis in the stationary coordinate system and a direction of magnetic flux (d axis) created by a magnetic pole of a permanent magnet used as a rotor is defined to be θ. In such a case, the position of an output axis of the stepping motor 509 (the rotational position) is represented by the angle θ. In the vector control, as illustrated in FIG. 4, the rotating coordinate system, represented by the d axis along the direction of magnetic flux of rotor and the q axis along the direction 90 degree advanced from the d axis (orthogonal to the d axis), with the position θ of the stepping motor 509 as a reference is used.

The motor controller 157 performs the vector control for controlling a driving current supplied to stepping motor 509 based on a current value on the rotating coordinate system with the position θ of the stepping motor 509 as a reference. In the vector control, the current vector corresponding to driving currents flowing in windings of A-phase and B-phase of stepping motor 509 is converted from the stationary coordinate system represented by the α axis and the β axis to the rotating coordinate system represented by the d axis and the q axis. As a result of the coordinate transformation, driving currents supplied to the stepping motor 509 are represented using a d axis component (d axis current) and a q axis component (q axis current) of the direct current in the rotating coordinate system. In this case, the q axis current corresponds to a torque current component that causes the stepping motor 509 to generate torque, and the d axis current corresponds to an excitation current component that influences a magnetic flux intensity of the rotor of the stepping motor 509. The motor controller 157 realizes the vector control of the stepping motor 509 by controlling the q axis current and the d axis current in the rotating coordinate system independently.

More specifically, the motor controller 157 estimates the position and the rotation speed of the rotor of the stepping motor 509 and performs the vector control based on the estimation result. The motor controller 157 includes the 3 control loops based on respective feedbacks to a position controller 501, a speed controller 502, and the current controllers 503 and 504, and the vector control is realized by these control loops, as illustrated in FIG. 3. Note that, in the motor controller 157 illustrated in FIG. 3, the estimation of the position θ of the stepping motor 509 is performed by an induced voltage calculation unit 512 and a position calculation unit 513. In addition, the estimation of the rotation speed ω of the stepping motor 509 is performed by a speed calculation unit 514 based on the estimated value of the position θ.

In the outermost control loop including the position controller 501, position control of the stepping motor 509 is performed based on a feedback of the estimated value of the position θ of the stepping motor 509. To the motor controller 157, the position command value θ_ref of the stepping motor 509 is provided from the CPU 151a of the system controller 151. The position controller 501 generates and outputs the speed command value ω_ref so that the deviation between the estimated value of the position θ of the stepping motor 509, fed back from the position calculation unit 513, and the position command value θ_ref (the target value)

approaches 0. In this way, the position control of the stepping motor 509 by the position controller 501 is performed.

In the control loop including the speed controller 502, speed control of the stepping motor 509 is performed based on a feedback of the estimated value of the rotation speed ω of the stepping motor 509. The speed controller 502 generates and outputs current command values iq_ref and id_ref so that the deviation between the estimated value of the rotation speed ω of the stepping motor 509, fed back from the speed calculation unit 514, and the speed command value ω_ref (the target value) approaches 0. Note that the current command values iq_ref and id_ref are the current command values in the rotating coordinate system after coordinate conversion from the stationary coordinate system (αβ axes) to the rotating coordinate system (dq axes).

In the control loop including the current controllers 503 and 504, a driving current supplied to a winding of each phase of the stepping motor 509 is controlled based on a feedback of the detected value of driving current flowing in the winding of each phase of the stepping motor 509. Here, current values iα and iβ of the currents (alternating currents) respectively flowing in the windings of A-phase and B-phase of the stepping motor 509 can be represented by the following equations using the position θ of the stepping motor 509 in the stationary coordinate system.

$$i\alpha = I^* \cos \theta$$

$$i\beta = I^* \sin \theta \quad (1)$$

In this case, the current values id and iq of the d axis current and the q axis current (direct-current) in the rotating coordinate system are represented by the coordinate transformation illustrated in the following equations.

$$id = \cos \theta^* i\alpha + \sin \theta^* i\beta$$

$$iq = -\sin \theta^* i\alpha + \cos \theta^* i\beta \quad (2)$$

With the above coordinate transformation, alternating current values iα and iβ flowing in the respective windings of A-phase and B-phase in the stationary coordinate system are converted to the direct-current values iq and id in the rotating coordinate system. Note that the q axis current is a torque current component (the first current component) that causes the stepping motor 509 to generate torque. The d axis current is an excitation current component (the second current component) that influences the magnetic flux intensity of the rotor of the stepping motor 509, and does not contribute to the generation of torque of the stepping motor 509.

The driving currents flowing in the windings of A-phase and B-phase of the stepping motor 509 are detected by respective current detection units 507 and 508 arranged between the PWM inverter 506 and the stepping motor 509. The values of the driving currents detected by the current detection units 507 and 508 are converted from analog values to digital values by an A/D converter 510 and thereby become possible to be brought in the CPU or a programmable device such as an FPGA or the like. The current values iα and iβ in the stationary coordinate system which are outputted from the A/D converter 510 are inputted to the coordinate converter 511 and the induced voltage calculation unit 512.

The coordinate converter 511 converts, according to Equations (2), the current values iα and iβ in the stationary coordinate system (αβ axes) to current values iq and id in the rotating coordinate system (dq axes) and outputs the converted values. The current controllers 503 and 504 are inputted difference values between the detected current values iq and id in the rotating coordinate system that are outputted from the coordinate converter 511, and corresponding current command values iq_ref and id_ref in the rotating coordinate system that are outputted from the speed controller 502. The current controllers 503 and 504 generate and output the current values iq' and id' in the rotating coordinate system, respectively, so that the respective inputted difference values (specifically, the deviation of the detected current values iq and id with respect to the corresponding current command values iq_ref and id_ref which are target values) approach 0. Note that the position controller 501, the speed controller 502 and the current controllers 503 and 504 are configured by, for example, a proportional compensator and an integral compensator, and realize feedback control by PI control.

The coordinate converter 505 inversely transforms current values iq' and id' in the rotating coordinate system outputted from the current controllers 503 and 504, by the following equations, to current values iα' and iβ' in the stationary coordinate system.

$$i\alpha' = \cos \theta^* id' - \sin \theta^* iq'$$

$$i\beta' = \sin \theta^* id' + \cos \theta^* iq' \quad (3)$$

The coordinate converter 505 outputs, to the PWM inverter 506 configured by the full bridge circuit and the induced voltage calculation unit 512, driving voltages Vα and Vβ in accordance with current values iα' and iβ' after the coordinate transformation to the stationary coordinate system.

In this way, the vector control unit 515 performs vector control to control the driving current supplying the winding of each phase of the stepping motor 509 by the current values of the rotating coordinate system (dq axes) with the position θ of the stepping motor 509 as a reference. The vector control unit 515 outputs driving voltages Vα and Vβ corresponding to the driving currents supplied to the stepping motor 509 as a result of the vector control based on the feedback of the estimated value of the position θ of the stepping motor 509. Note that, in the vector control, the d axis current, which is the current component not contributing to generation of torque of stepping motor 509, is normally controlled so that its value becomes 0. In other words, in the vector control unit 515, the current command value id_ref is set to be 0.

In the PWM inverter 506, the full bridge circuit is driven by driving voltages Vα and Vβ inputted from the coordinate converter 505. As a result, the PWM inverter 506 drives the stepping motor 509 by supplying the driving current to the winding of each phase of the stepping motor 509 in accordance with the driving voltages Vα and Vβ.

<Sensorless Control>

As described above, in the vector control, in order to perform the position control and the speed control of the motor, there is a need for the feedback of information indicating the position and rotation speed of the motor. Specifically, in the configuration shown in FIG. 3, it is necessary to respectively feed back position information indicating the position θ of the stepping motor 509 and speed information indicating the rotation speed ω of the stepping motor 509 to the position controller 501 and the speed controller 502.

Normally, in order to detect (estimate) the position and the rotation speed of the motor, a rotary encoder is attached to the motor, and the position is detected based on the number of output pulses of the encoder, and the rotation speed is detected based on a period of the output pulses of the encoder. However, as described above, cost increase and installation space allocation become problems due to the adding of the encoder which is originally unnecessary to run the stepping motor. Thus, sensorless control of estimating the position and rotation speed of the motor without using a sensor for position detection such as an encoder, and performing the vector control based on such an estimation result is proposed. In the following, the sensorless control of the stepping motor 509 is explained with reference to FIG. 3 again.

Firstly, the induced voltage calculation unit 512 calculates induced voltages (counter-electromotive voltages of the A-phase and the B-phase) induced respectively in the windings of the A-phase (first phase) and the B-phase (second phase) in accordance with the rotation (of the rotor) of the stepping motor 509. Specifically, current values $i\alpha$ and $i\beta$ after conversion to digital values by the A/D converter 510, and driving voltages $V\alpha$ and $V\beta$ of the stepping motor 509 which are outputted from the vector control unit 515 are input to the induced voltage calculation unit 512. The induced voltage calculation unit 512 calculates induced voltages $E\alpha$ and $E\beta$ of the stepping motor 509, by following voltage equations, from the driving voltages $V\alpha$ and $V\beta$ and the current values $i\alpha$ and $i\beta$ for each of the A-phase and the B-phase.

$$E\alpha = V\alpha - R*i\alpha - L*di\alpha/dt$$

$$E\beta = V\beta - R*i\beta - L*di\beta/dt \quad (4)$$

Here, R is a winding resistance and L is a winding inductance. The values of R and L are particular to the used stepping motor 509 and are stored in advance in the ROM 151b or a memory (not shown) arranged within the motor controller 157.

Induced voltages $E\alpha$ and $E\beta$ of the A-phase and the B-phase calculated by the induced voltage calculation unit 512 are input to the position calculation unit 513. The position calculation unit 513 calculates an estimated value of a position $\theta$ of the stepping motor 509 by the following equation, from a ratio between the induced voltage $E\alpha$ of A-phase and the induced voltage $E\beta$ of B-phase.

$$\theta = \tan^{-1}(-E\beta/E\alpha) \quad (5)$$

The position calculation unit 513 outputs (feeds back) an estimated value of the position $\theta$ obtained by such estimation computation to the position controller 501 and the speed calculation unit 514. Note that the estimated value of the position $\theta$ is used in the coordinate conversion and the like by additionally being fed back from the position calculation unit 513 to the speed controller 502, and the coordinate converters 505 and 511.

The speed calculation unit 514 calculates an estimated value of the rotation speed $\omega$ of the stepping motor 509 from the inputted position $\theta$ by the following equation.

$$\omega = d\theta/dt \quad (6)$$

As in Equation (6), the rotation speed $\omega$ is calculated on the basis of temporal change of the estimated value of the position $\theta$. The speed calculation unit 514 outputs (feeds back) the obtained rotation speed $\omega$ to the speed controller 502.

Figure 5:
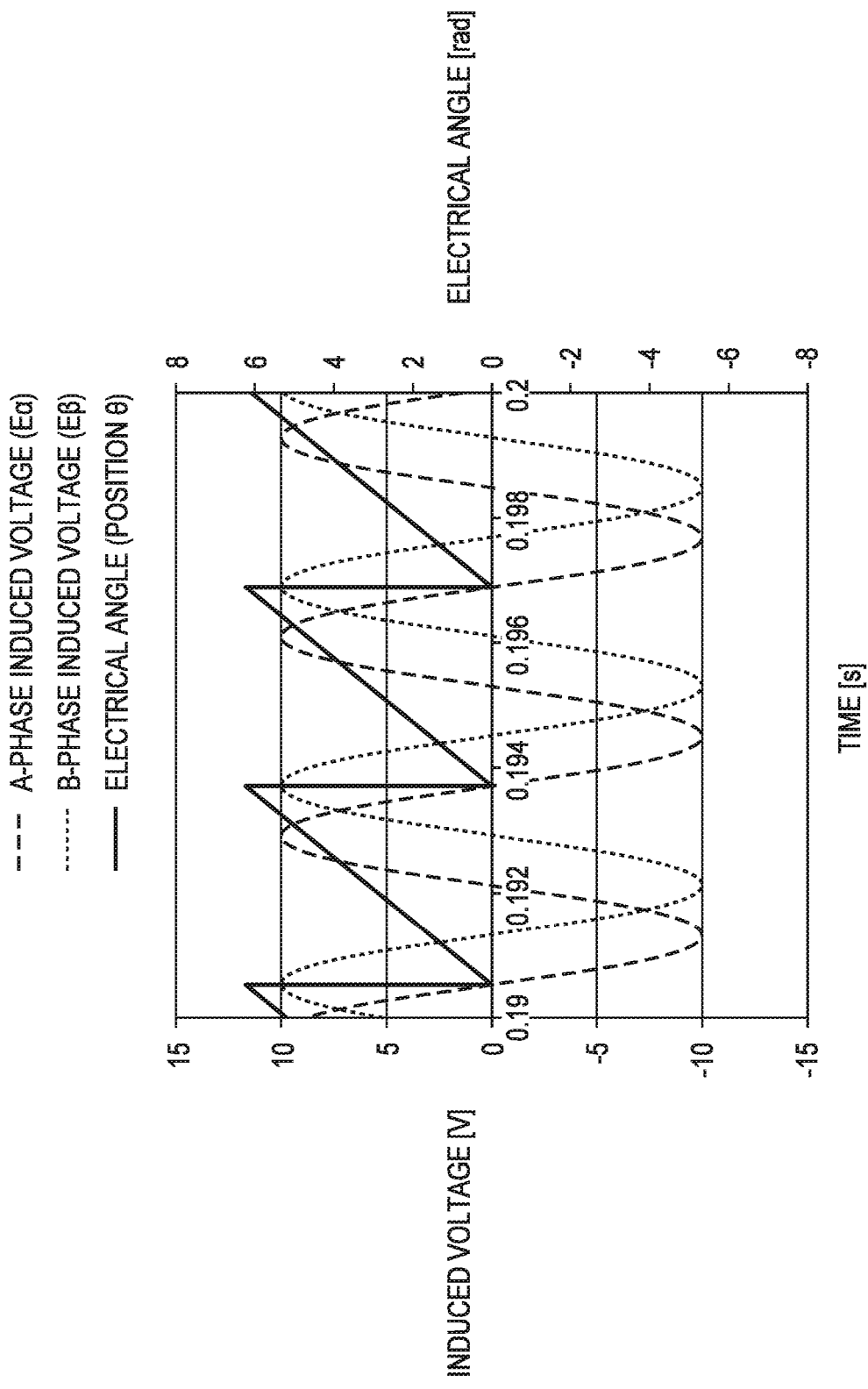
FIG. 5 illustrates an example of a relationship between induced voltages and an electrical angle of a stepping motor.

FIG. 5 illustrates an example of a relationship between induced voltages $E\alpha$ and $E\beta$ calculated by Equation (4) and an electrical angle (position $\theta$) of the stepping motor 509 calculated by Equation (5). Note that FIG. 5 illustrates simulation results as an example of when the winding resistance R=3.41[$\Omega$], the winding inductance L=4.3[mH] and the rotation speed $\omega$ of the stepping motor 509=13.5 [rps]. According to the simulation results illustrated in FIG. 5, induced voltages $E\alpha$ and $E\beta$ have a phase difference of 90 degrees, and an electrical angle in according with a ratio of their amplitudes can be confirmed to be calculated as the position $\theta$ of the stepping motor 509.

<Correction of Estimated Value of Position $\theta$>

In the motor controller 157, the sensorless control of the stepping motor 509 is realized by estimating the electrical angle (position $\theta$) of the stepping motor 509 as illustrated in FIG. 5 by the above described estimation computation in the induced voltage calculation unit 512 and the position calculation unit 513. However, actually, the estimation computation to estimate an electrical angle of the stepping motor 509 requires a certain amount of time (specifically, a delay occurs in accompaniment of the estimation computation). As a result, an error with respect to the actual value occurs in the estimated value of an electrical angle (position $\theta$) of the stepping motor 509 due to the delay accompanying the estimation computation.

Figure 6A:
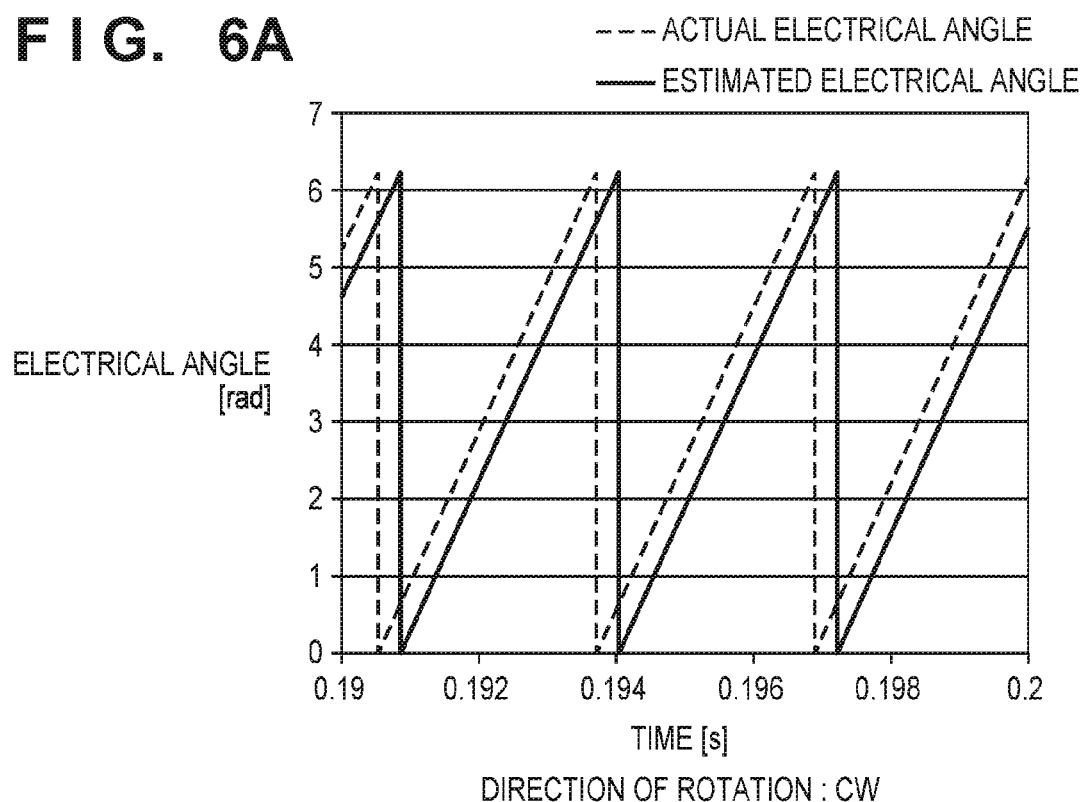
FIGS. 6A and 6B illustrate an example of a relationship between an estimated electrical angle and an actual electrical angle of the stepping motor.
Figure 6B:
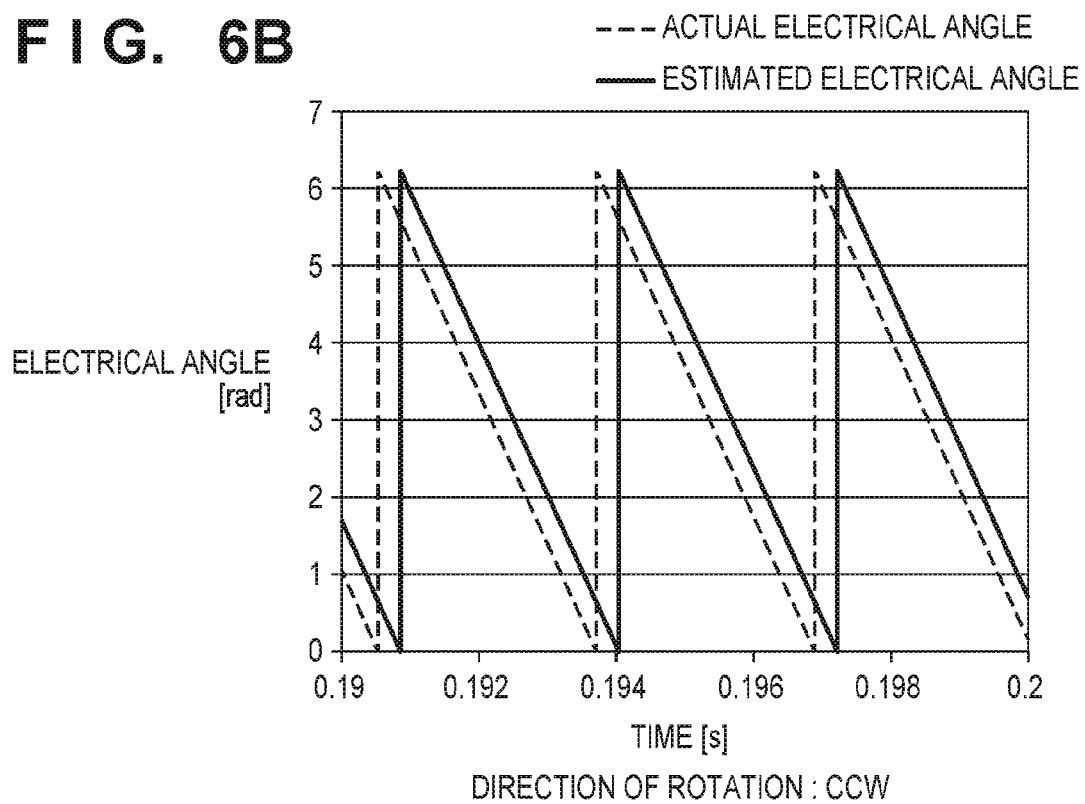

FIGS. 6A and 6B illustrate an example of a relationship between an estimated electrical angle and an actual electrical angle of the stepping motor 509. FIG. 6A illustrates a case in which the stepping motor 509 is rotating in the CW direction, and FIG. 6B illustrates a case in which the stepping motor 509 is rotating in the CCW direction. The stepping motor 509 generates a predetermined amount of rotation during the time from the start of the estimation computation of an electrical angle based on a value of the detected driving current to the completion of the estimation computation (obtainment of an estimated value). For this reason, as in FIGS. 6A and 6B, the estimated electrical angle obtained by the estimation computation results in a predetermined amount of phase offset being generated as an error with respect to the actual electrical angle of the stepping motor 509.

Also, as in FIG. 6A, in a case where the stepping motor 509 is rotating in the CW direction, "the estimated electrical angle<the actual electrical angle", that is, a phase delay of a predetermined amount from the actual electrical angle occurs in the estimated electrical angle. In contrast, as in FIG. 6B, in a case where the stepping motor 509 is rotating in the CCW direction, "the estimated electrical angle>the actual electrical angle", that is, a phase advance of a predetermined amount from the actual electrical angle occurs in the estimated electrical angle.

Figure 7:
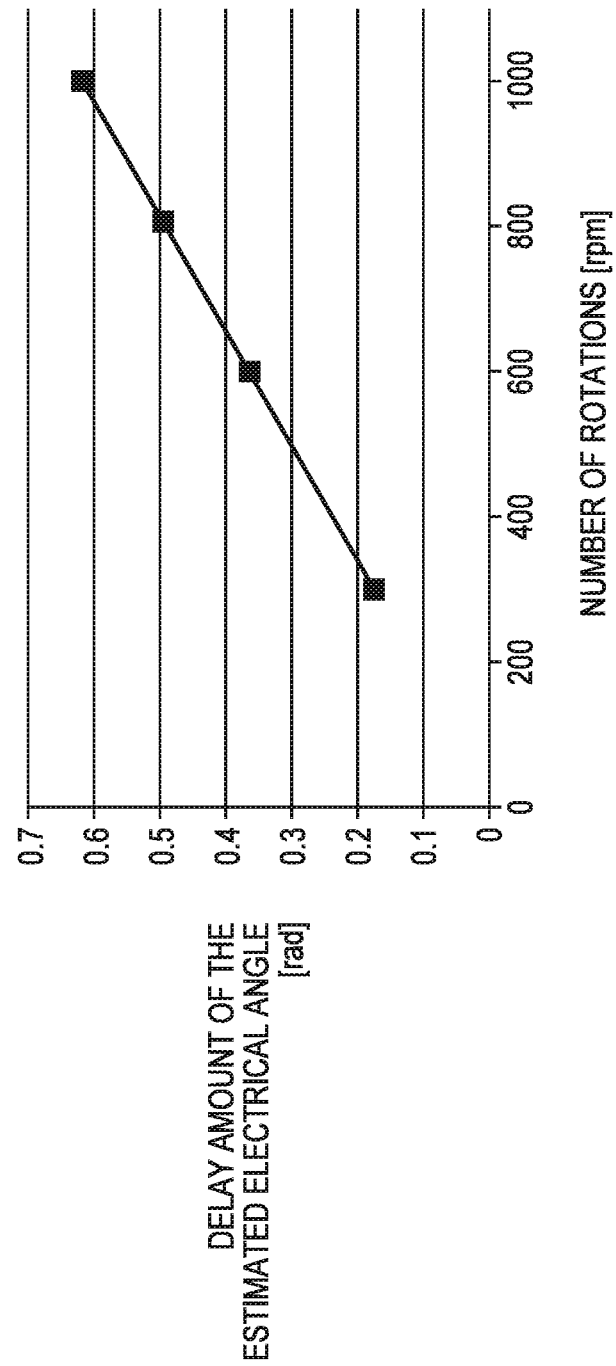
FIG. 7 illustrates an example of a relationship between a rotation speed of the stepping motor and a delay amount of the estimated electrical angle.

In addition, if the control period of the stepping motor 509 by the motor controller 157 is fixed, then the phase offset amount becomes larger the faster the rotation speed of the stepping motor 509 is. FIG. 7 illustrates an example of a relationship between a rotation speed (number of rotations) of the stepping motor and a delay amount of the estimated electrical angle. According to FIG. 7, it can be seen that the delay amount (a phase delay) of the estimated electrical angle with respect to the actual electrical angle becomes larger in proportion to the rotation speed (number of rotations) of the stepping motor 509. In this way, the larger the rotation speed of the stepping motor 509, the larger the error of the estimated electrical angle with respect to the actual electrical angle, and as a result, there is the possibility that not only the efficiency of control of the motor in the vector control will be worsened, but a state in which it is impossible to control the motor will be reached.

Accordingly, in the vector control of the motor by the sensorless control, it is necessary to prevent the motor from reaching a state in which control is impossible while improving control efficiency in the vector control, by reducing the estimation error that arises due to the delay accompanying the estimation computation of the motor position. In the present embodiment, in order to prevent the stepping motor 509 from reaching a state in which control is impossible while maintaining control efficiency at a maximum in the vector control, the estimated value of the position θ of the stepping motor 509 is corrected, and the vector control is performed using the corrected estimated value. Specifically, the motor controller 157 corrects the estimated value in accordance with the rotation speed of the stepping motor 509, so that the error that occurs in the estimated value of the position θ due to the delay accompanying the estimation computation for estimating the position θ of the stepping motor 509 is reduced.

Figure 8:
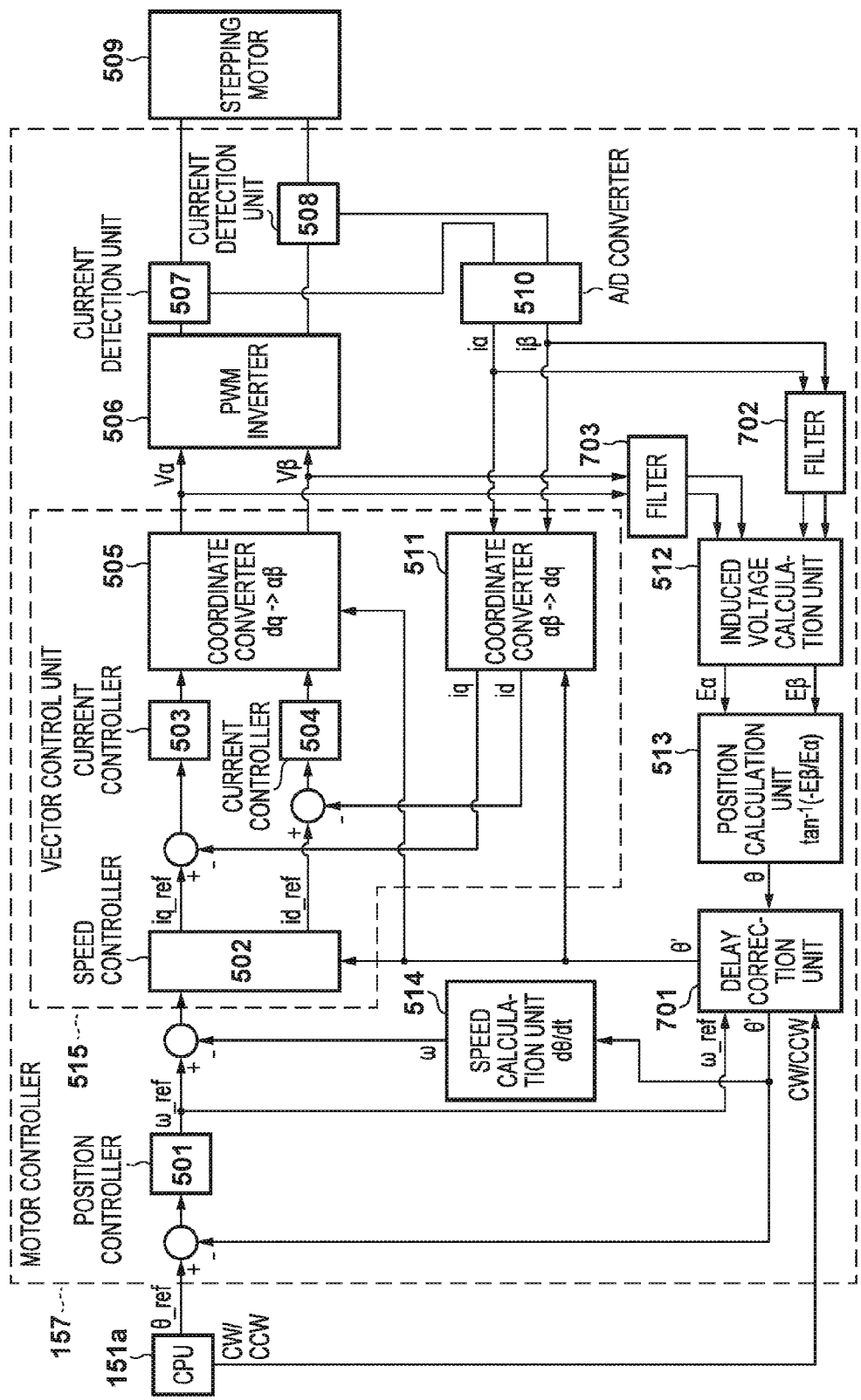
FIG. 8 is a block diagram for illustrating an example configuration of a motor controller.

FIG. 8 is a block diagram for illustrating an example configuration of the motor controller 157 according to the present embodiment. As illustrated in FIG. 8, the motor controller 157 has a configuration that adds a delay correction unit 701 to the output side of the position calculation unit 513 in the configuration illustrated in FIG. 3. The delay correction unit 701 corrects the estimated value in accordance with the rotation speed of the stepping motor 509 so that the above-described error that occurs in the estimated value of the position θ due to the delay accompanying the position θ estimation computation of the stepping motor 509 is reduced, and outputs the corrected estimated value θ'. In the present embodiment, rather than the estimated value of the position θ outputted from the position calculation unit 513 itself, the estimated value θ' after correction of the position θ outputted from the delay correction unit 701 is fed back for the vector control of the stepping motor 509. In other words, the vector control unit 515 performs the vector control of the stepping motor 509 based on the estimated value θ' after correction of the position θ of the stepping motor 509.

More specifically, the delay correction unit 701 determines a correction amount α for correcting the delay accompanying the estimation computation of the position θ in accordance with the rotation speed of (the rotor of) the stepping motor 509, and corrects the estimated value of the position θ by the determined correction amount α. As explained with reference to FIG. 7, a larger error arises in the estimated value of the position θ obtained by the estimation computation of the induced voltage calculation unit 512 and the position calculation unit 513 as the rotation speed of the stepping motor 509 becomes faster. Accordingly, the delay correction unit 701 determines, so that the error that changes in accordance with the rotation speed is reduced, the correction amount α to be a larger value the faster the rotation speed of the stepping motor 509 is, and corrects the estimated value of the position θ by the determined correction amount α.

The delay correction unit 701 obtains the corrected estimated value θ' by adding the determined correction amount α to the estimated value of the position θ outputted from the position calculation unit 513. The delay correction unit 701 outputs (feeds back) the corrected estimated value θ' to the position controller 501 and the speed calculation unit 514. Note that the corrected estimated value θ' is used in the coordinate conversion and the like by additionally being fed back from the delay correction unit 701 to the speed controller 502, and the coordinate converters 505 and 511.

In this embodiment, the delay correction unit 701, as illustrated in FIG. 8, determines the correction amount α in accordance with a speed command value ω_ref output from the position controller 501 (that is obtained from the position command value θ_ref provided from the CPU 151a). However, the delay correction unit 701 may determine the correction amount α in accordance with the rotation speed ω calculated by the speed calculation unit 514. In this respect, when the rotation of the stepping motor 509 is accelerated or decelerated, an error due to the delay accompanying the estimation computation for the position θ and the rotation speed ω may occur in the rotation speed ω calculated by the speed calculation unit 514. For this reason, in such a case, the delay correction unit 701 may determine the correction amount α in accordance with the speed command value ω_ref rather than the rotation speed ω calculated by the speed calculation unit 514.

Also, in cases in which the stepping motor 509 is used as a driving source of a reversing roller such as the conveyance roller 320 and the reversing roller 321, the rotation direction of the motor changes during the drive control of the motor. For example, when forming images on both sides of a recording sheet in the image forming apparatus 100, or when the image forming apparatus 100 causes the front and back of a recording material to be reversed and then discharges it, the rotation direction of the stepping motor 509 changes in accordance with the direction of conveyance of the recording sheet by the reversing roller. In such cases, as explained with reference to FIGS. 6A, 6B and 7, a phase delay or a phase advance may occur in the estimated value of the phase θ depending on the rotation direction (the CW direction or the CCW direction) of the stepping motor 509. Accordingly, if the rotation direction of the stepping motor 509 changes during the drive control, there is a need for the delay correction unit 701 to perform a correction of the estimated value of the phase θ in accordance with the rotation direction of the stepping motor 509.

In this embodiment, in the case where the rotation direction of the stepping motor 509 is CW (first rotation direction), the delay correction unit 701 adds the correction amount α in accordance with the rotation speed of the stepping motor 509 to the estimated value of the phase θ so that the phase delay is reduced. Meanwhile, in the case where the rotation direction of the stepping motor 509 is CCW (a second rotation direction opposite the first rotation direction), the delay correction unit 701 subtracts the correction amount α in accordance with the rotation speed of the stepping motor 509 from the estimated value of the phase θ so that the phase advance is reduced. Note that the delay correction unit 701 corrects the estimated value of the phase θ based on information indicating the rotation direction of the stepping motor 509 provided from the CPU 151a. By this processing, correction of the estimated value of the phase θ in accordance with the change in the rotation direction of the stepping motor 509 becomes possible.

The delay correction unit 701 can determine the correction amount α corresponding to the rotation speed of the stepping motor 509 by the following Equation (7).

$$\alpha = S*td \text{ [sec]} * \omega\_ref \text{ [rps]} * 2\pi*N + \theta f \text{ [rad]} \quad (7)$$

Here, S represents a polarity of the rotation direction (S=1 if CW and S=−1 if CCW), td represents the delay time (calculation delay time) accompanying the estimation computation of the phase θ, (2π*N) represents the electrical angle for 1 period of the mechanical angle, and θf represents the phase delay based on a filter 702. If the instruction signal CW/CCW provided from the CPU 151a is logic (for example, 'H') indicating CW, then S=1, and if it is logic (for example, 'L') indicating CCW, then S=−1. The values of td, (2π*N) and θf are stored in advance in the ROM 151b or a memory (not shown) arranged in the motor controller 157. Note that if the filter 702 does not exist in the motor controller 157, θf is unnecessary in Equation (7).

Alternatively, the correction amount α corresponding to the rotation speed (the speed command value ω_ref) of the stepping motor 509 may be obtained by Equation (7) in advance. In such a case, data indicating the relationship between the rotation speed (the speed command value ω_ref) of the stepping motor 509, and the correction amount α corresponding to the rotation speed may be stored in advance in the ROM 151b or the memory (not shown) arranged in the motor controller 157. In this case, the delay correction unit 701 may, rather than performing a calculation for determining the correction amount α, correct the estimated value of the phase θ by a correction amount α that corresponds to the speed command value ω_ref and that data stored in the ROM 151b or the memory indicates.

In the motor controller 157, as illustrated in FIG. 8, the filter 702 may be arranged between the A/D converter 510 and the induced voltage calculation unit 512. In the present embodiment, the filter 702 is arranged between the A/D converter 510 and the induced voltage calculation unit 512, and is a digital filter for performing filtering to remove a high-frequency component from digital values after A/D conversion by the A/D converter 510. The filter 702, by performing filtering on the digital signals indicating the values of the driving currents detected by the current detection units 507 and 508, removes (or at least reduces) noise from these signals. In such a case, a delay will arise in the signal that passes through the filter 702 in accompaniment of the filtering by the filter 702. For this reason, a filter 703 may also be arranged for driving voltages Vα and Vβ so that the timing of input into the induced voltage calculation unit 512 is to be aligned between the signals that pass through the filter 702 and the corresponding driving voltages Vα and Vβ. As illustrated in FIG. 8, the filter 703 is arranged between the coordinate converter 505 and the induced voltage calculation unit 512 so that filtering to remove a high-frequency component is performed for the driving voltages Vα and Vβ to be input into the induced voltage calculation unit 512. A delay similar to that of the filter 702 is given to the driving voltages Vα and Vβ by the filter 703. Note that, in place of the filter 702, an analog filter may be arranged to remove noise at a preceding stage to the A/D converter 510.

If the filter 702 is arranged in the motor controller 157 as illustrated in FIG. 8, not only a delay accompanying the estimation computation of the phase θ but also a delay accompanying filtering by the filter 702 occurs. Accordingly, it is possible that it is necessary to correct the estimation error of the position θ that arises due to such a delay accompanying the filtering. In such a case, the delay correction unit 701 may determine the correction amount α as in for example Equation (7) so that the error that occurs in the estimated value of the position θ due to the delay accompanying the filtering and the delay accompanying the estimation computation are reduced, and correct the estimated value of the position θ. With this, it is possible to reduce the estimation error of the position θ that occurs due to the delay accompanying the filtering by the filter 702.

Note that in the present embodiment, as illustrated in FIG. 8, the corrected estimated value θ' that is output from the delay correction unit 701 is used as the input of the speed calculation unit 514, but the estimated value of the phase θ that is output from the position calculation unit 513 may also be used. This is because if the stepping motor 509 is rotating at a fixed speed, even if an error occurs in the estimated value of the phase θ, there is no influence on the amount of change of the phase θ per unit time as is clear from FIG. 5.

<Flow of Control by Motor Controller>

FIG. 9 is a flowchart for illustrating a control flow executed by the motor controller 157 illustrated in FIG. 8. Note that the motor controller 157 may be configured by a device such as an FPGA, an ASIC and the like, and in such a case, the control flow illustrated in FIG. 9 illustrates a procedure of processing in accordance with a function that such a circuit has.

When the sensorless control is started by an instruction from the CPU 151a, the motor controller 157 executes the vector control as described above based on a command value (θ_ref) from the CPU 151a in step S101. Specifically, the driving voltages Vα and Vβ are output to the PWM inverter 506 from the vector control unit 515 by position control, speed control and current control being executed respectively by the position controller 501, the speed controller 502, and the current controllers 503 and 504 in the motor controller 157. Additionally, a driving current is supplied to the winding of each phase of the stepping motor 509 from the PWM inverter 506.

At that time, the motor controller 157, in step S102, detects the driving voltages Vα and Vβ of the stepping motor 509 output by the vector control unit 515 and the post-A/D conversion values iα and iβ of the driving currents detected by the current detection unit 507. Based on these detection results, the motor controller 157 (the induced voltage calculation unit 512) calculates the induced voltages Eα and Eβ using Equation (4) in step S103. Additionally, in step S104, the motor controller 157 (the position calculation unit 513) calculates the estimated value of the position θ of the stepping motor 509 using Equation (5).

Next, in step S105, the motor controller 157 (the delay correction unit 701) performs delay correction regarding delay accompanying the estimation computation of the position θ and delay accompanying the filtering by the filter 702 based on the speed command value ω_ref output from the position controller 501. Specifically, the delay correction unit 701 executes the delay correction by adding the foregoing correction amount α to the estimated value of the position θ of the stepping motor 509, thereby obtaining the estimated value A' after the correction. Note that the correction amount α may be determined based on Equation (7), or may be determined based on data stored in advance in a storage device such as the ROM 151b.

Additionally, in step S106, the motor controller 157 (the speed calculation unit 514) calculates the estimated value of the rotation speed ω of the stepping motor 509 using Equation (6). After this, in step S107, the motor controller 157 determines whether or not to finish the sensorless control, based on an instruction from the CPU 151a. If the result of that determination is that the sensorless control continues, the motor controller 157 executes the vector control in step S101 based on the corrected estimated value θ' obtained in step S105 and the estimated value of the rotation speed ω obtained in step S106. Further, the motor controller 157 executes the processing of step S102 through step S107. In this way, the motor controller 157 repeats the processing of step S101 through step S107 until the sensorless control is finished in step S107.

As explained above, in the present embodiment, the motor controller 157, based on the position command value θ_ref, executes the vector control for controlling the driving current supplied to the stepping motor 509 based on the current value on the rotating coordinate system with the position θ of the motor as a reference. With this, a driving current is supplied to the winding of each phase of the stepping motor 509. The motor controller 157 detects a driving current flowing in the winding of each phase of the stepping motor 509, and estimates the position θ to be used for the vector control by the estimation computation based on this detection result. The motor controller 157 corrects the estimated value of the position θ in accordance with the rotation speed of the stepping motor so that the error that occurs in the estimated value due to the delay accompanying the estimation computation is reduced. With this, it is possible to reduce the estimation error that occurs due to the delay accompanying the estimation computation of the position θ of the stepping motor 509. As a result, it is possible to prevent the motor from reaching a state in which control is impossible while improving efficiency of power consumption of the motor by the vector control.

Note that in the foregoing embodiment, explanation is given for an example in which the stepping motor is the control target of the motor controller 157. However, it is possible to apply the foregoing embodiment in cases where vector control is used for a drive control of a motor of a type other than a stepping motor, and in such cases, a similar advantage to the foregoing advantage can be expected.

For example, the foregoing embodiment can be applied in a case where a drive control of a brushless DC motor (not shown graphically) that drives the photosensitive drum 309 is realized by vector control. Generally, in a case where a recording sheet is a thick paper, it is necessary to slow the conveyance speed of the recording sheet to maintain a fixing characteristic by the fixing unit 318, and it is necessary to also slow the rotation speed of the brushless DC motor that drives the photosensitive drum 309 to match with that. In other words, there are cases in which the rotation speed for the brushless DC motor that drives the photosensitive drum 309 is changed in accordance with the type of the recording sheet used for image formation. In such cases, when the foregoing vector control is applied to the drive control of the brushless DC motor, it is possible that the faster the motor rotation speed becomes, the larger the estimation error of the rotational position of the motor may become. By applying the embodiment described above to the vector control of the brushless DC motor, it is possible to obtain a similar advantage to the foregoing advantage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-103173, filed May 20, 2015, which is hereby incorporated by reference herein in its entirety.

What is claimed is:

1. A motor control apparatus that performs a drive control of a motor, the apparatus comprising:
    a current detector configured to detect a driving current flowing in a winding of the motor;
    a calculator configured to calculate an estimated value indicating a rotational position of a rotor of the motor by an estimation computation based on a value of the driving current detected by the current detector;
    a corrector configured to correct the estimated value of the rotational position based on a rotation amount of the rotor in a predetermined period from a start of the estimation computation by the calculator until completion of the estimation computation; and
    a controller configured to control the driving current flowing in the winding of the motor so that a deviation between the estimated value corrected by the corrector and an instructed value indicating a target position of the rotor is reduced.

2. The motor control apparatus according to claim 1, wherein
    the corrector corrects the estimated value by a first correction amount if a rotation speed of the rotor is a first speed, and corrects the estimated value by a second correction amount that is larger than the first correction amount if the rotation speed of the rotor is a second speed that is faster than the first speed.

3. The motor control apparatus according to claim 1, wherein
    the corrector adds a correction amount in accordance with a rotation speed of the rotor to the estimated value if a rotation direction of the rotor is a first rotation direction, and subtracts the correction amount from the estimated value if the rotation direction of the rotor is a second rotation direction opposite the first rotation direction.

4. The motor control apparatus according to claim 3, wherein
    the corrector corrects the estimated value based on information that indicates the rotation direction of the rotor and is provided from an external controller.

5. The motor control apparatus according to claim 1, further comprising a storage unit configured to store data indicating a relationship between a rotation speed of the rotor and a correction amount corresponding to the rotation speed,
    wherein the corrector corrects the estimated value by the correction amount that the data stored in the storage unit indicates.

6. The motor control apparatus according to claim 1, further comprising a filter for removing a high-frequency component from a value of the driving current detected by the current detector.

7. The motor control apparatus according to claim 1, the corrector corrects the estimated value in accordance with a rotation speed of the rotor obtained from the instructed value provided from an external controller.

8. The motor control apparatus according to claim 1, further comprising a speed calculator configured to calculate a rotation speed of the rotor based on an amount by which the estimated value changes in a second predetermined period,
    wherein the corrector corrects the estimated value in accordance with the rotation speed of the rotor calculated by the speed calculator.

9. The motor control apparatus according to claim 1, wherein
    the calculator comprises:
    a voltage calculator configured to, for each of a first phase and a second phase of the motor, calculate an induced voltage that is induced in the winding in accordance with a rotation of the rotor based on the value of the driving current detected by the current detector; and
    a position calculator configured to calculate the estimated value based on a the induced voltage calculated by the voltage calculator.

10. An image forming apparatus comprising
    an image formation unit configured to form an image on a recording material;
    a motor configured to drive a load; and a motor control apparatus that performs a drive control of the motor,
wherein the motor control apparatus comprises:
a current detector configured to detect a driving current flowing in a winding of the motor;
a calculator configured to estimate an estimated value indicating a rotational position of a rotor of the motor by an estimation computation based on a value of the driving current detected by the current detector;
a corrector configured to correct the estimated value of the rotational position based on a rotation amount of the rotor in a predetermined period from a start of the estimation computation by the calculator until completion of the estimation computation; and
a controller configured to control the driving current flowing in the winding of the motor so that a deviation between the estimated value corrected by the corrector and an instructed value indicating a target position of the rotor is reduced.

11. The image forming apparatus according to claim 10, wherein
the load is a reversing roller for reversing a direction of conveyance of the recording material on a conveyance path when forming an image on both sides of the recording material by the image formation unit or when reversing a first surface and a second surface of the recording material to which image forming is performed by the image formation unit and discharging the recording material.

12. The motor control apparatus according to claim 1, wherein
the corrector corrects the estimated value by a correction amount for reducing an error that occurs in the estimated value due to the rotor rotating in the predetermined period.

13. The motor control apparatus according to claim 12, further comprising a filter for removing a high-frequency component from a value of the driving current detected by the current detector, wherein
the correction amount includes an amount that reduces an error occurring in the estimated value of the rotational position with respect to an actual rotational position of the rotor due to filtering by the filter.

14. The motor control apparatus according to claim 1, wherein
the rotation amount of the rotor in the predetermined period is determined based on a rotation speed of the rotor and the predetermined period.

15. The motor control apparatus according to claim 1, wherein
the controller controls the driving current flowing in the winding of the motor based on a torque current component value and an excitation current component value so as to reduce the deviation between the instructed value and the estimated value corrected by the corrector,
wherein the torque current component is a current component of a current value expressed in a rotating coordinate system based on the rotational position which corresponds to the estimated value corrected by the corrector and a current component for generating torque in the rotor, and the excitation current component is a current component of the current value expressed in the rotating coordinate system and a current component affecting intensity of a magnetic flux penetrating through the winding of the motor.

16. The motor control apparatus according to claim 15, wherein
the controller controls the driving current by controlling the torque current component so as to reduce the deviation between the instructed value and the estimated value corrected by the corrector, and controlling the excitation current component so that the current value of the excitation current component becomes 0.

17. A motor control apparatus that performs a drive control of a motor, the apparatus comprising:
a current detector configured to detect a driving current flowing in a winding of the motor;
a position calculator configured to calculate an estimated value indicating a rotational position of a rotor of the motor by an estimation computation based on a value of the driving current detected by the current detector;
a speed calculator configured to calculate a rotation speed of the rotor based on the estimated value calculated by the position calculator;
a controller configured to control the driving current flowing in the winding of the motor based on a torque current component value and an excitation current component value so as to reduce a deviation between the rotation speed calculated by the speed calculator and an instructed speed indicating a target speed of the rotor; and
a corrector configured to correct the estimated value of the rotational position based on a rotation amount of the rotor in a predetermined period from a start of the estimation computation by the calculator until completion of the estimation computation,
wherein the torque current component is a current component of a current value expressed in a rotating coordinate system based on the rotational position which corresponds to the estimated value corrected by the corrector and a current component for generating torque in the rotor, and the excitation current component is a current component of the current value expressed in the rotating coordinate system and a current component affecting intensity of a magnetic flux penetrating through the winding of the motor.

18. A sheet conveyance apparatus for conveying a sheet, the sheet conveyance apparatus comprising:
a conveyance roller configured to convey the sheet;
a motor configured to drive the conveyance roller; and
a motor control apparatus that performs a drive control of the motor,
wherein the motor control apparatus comprises:
a current detector configured to detect a driving current flowing in a winding of the motor;
a calculator configured to calculate an estimated value indicating a rotational position of a rotor of the motor by an estimation computation based on a value of the driving current detected by the current detector;
a corrector configured to correct the estimated value of the rotational position based on a rotation amount of the rotor in a predetermined period from a start of the estimation computation by the calculator until completion of the estimation computation; and
a controller configured to control the driving current flowing in the winding of the motor so that a deviation between the estimated value corrected by the corrector and an instructed value indicating a target position of the rotor is reduced.

19. A document feeding apparatus for feeding a document, the document feeding apparatus comprising:
a document tray configured to stack a document;

a conveyance roller configured to convey the document stacked on the document tray;

a motor configured to drive the conveyance roller; and a motor control apparatus that performs a drive control of the motor, wherein the motor control apparatus comprises:

a current detector configured to detect a driving current flowing in a winding of the motor;

a calculator configured to calculate an estimated value indicating a rotational position of a rotor of the motor by an estimation computation based on a value of the driving current detected by the current detector;

a corrector configured to correct the estimated value of the rotational position based on a rotation amount of the rotor in a predetermined period from a start of the estimation computation by the calculator until completion of the estimation computation; and a controller configured to control the driving current flowing in the winding of the motor so that a deviation between the estimated value corrected by the corrector and an instructed value indicating a target position of the rotor is reduced.

20. A document reading apparatus for reading an image on a document, the document reading apparatus comprising:

a document tray configured to stack a document;

a conveyance roller configured to convey the document stacked on the document tray;

a reading unit configured to read the document conveyed by the conveyance roller;

a motor configured to drive the conveyance roller; and a motor control apparatus that performs a drive control of the motor, wherein the motor control apparatus comprises:

a current detector configured to detect a driving current flowing in a winding of the motor;

a calculator configured to calculate an estimated value indicating a rotational position of a rotor of the motor by an estimation computation based on a value of the driving current detected by the current detector;

a corrector configured to correct the estimated value of the rotational position based on a rotation amount of the rotor in a predetermined period from a start of the estimation computation by the calculator until completion of the estimation computation; and a controller configured to control the driving current flowing in the winding of the motor so that a deviation between the estimated value corrected by the corrector and an instructed value indicating a target position of the rotor is reduced.

21. The image forming apparatus according to claim 10, wherein the load is a conveyance roller configured to convey the recording material.

* * * * *